US009282539B2

(12) United States Patent
Tian et al.

(10) Patent No.: US 9,282,539 B2
(45) Date of Patent: Mar. 8, 2016

(54) SYSTEM AND METHOD FOR CHANNEL-DEPENDENT CCA THRESHOLDS TO BALANCE DIFFERENT USE CASES IN WIRELESS NETWORKS

(71) Applicant: QUALCOMM Incorporated, San Diego, CA (US)

(72) Inventors: Bin Tian, San Diego, CA (US); Sameer Vermani, San Diego, CA (US); Eugene Jong-Hyon Baik, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 14/227,909

(22) Filed: Mar. 27, 2014

(65) Prior Publication Data

US 2014/0293905 A1    Oct. 2, 2014

Related U.S. Application Data

(60) Provisional application No. 61/856,520, filed on Jul. 19, 2013, provisional application No. 61/807,517, filed on Apr. 2, 2013.

(51) Int. Cl.
*H04W 72/02* (2009.01)
*H04W 74/08* (2009.01)
*H04B 17/382* (2015.01)

(52) U.S. Cl.
CPC ............. *H04W 72/02* (2013.01); *H04B 17/382* (2013.01); *H04W 74/0808* (2013.01)

(58) Field of Classification Search
CPC . H04B 17/382; H04W 72/02; H04W 74/0808
See application file for complete search history.

(56) References Cited

U.S. PATENT DOCUMENTS

2013/0016642 A1    1/2013   Banerjea et al.
2015/0131641 A1*   5/2015   Ong et al. ................... 370/338

OTHER PUBLICATIONS

Minyoung Park: "IEEE 802.11ac: Dynamic Bandwidth Channel Access", ICC 2011-2011 IEEE International Conference on Communications Jun. 5-9, 2011—Kyoto, Japan, pp. 1-5, XP031908841.*

(Continued)

*Primary Examiner* — Siming Liu
(74) *Attorney, Agent, or Firm* — Knobbe Martens Olson & Bear LLP

(57) ABSTRACT

Systems and methods for channel-dependent CCA thresholds to balance different use cases in wireless networks are disclosed. In one aspect a device includes a receiver configured to receive transmissions on a plurality of channels. The device also includes a processor configured to determine whether a channel is one at least a first type or a second type of channel. If the channel is the first type, the processor is configured to determine whether the channel is available based at least in part on a set of first clear channel assessment thresholds. If the channel is the second type, the processor is configured to determine whether the channel is available based at least in part on a set of second clear channel assessment thresholds, where the set of second clear channel assessment thresholds is greater than or equal to the set of first clear channel assessment thresholds.

25 Claims, 6 Drawing Sheets

(56) References Cited

OTHER PUBLICATIONS

International Search Report and Written Opinion—PCT/US2014/032254—ISA/EPO—Sep. 8, 2014.

Minyoung Park: "IEEE 802.11ac: Dynamic Bandwidth Channel Access", ICC 2011—2011 IEEE International Conference on Communications—Jun. 5-9, 2011—Kyoto, Japan, IEEE, Piscataway, NJ, USA, Jun. 5, 2011, pp. 1-5, XP031908841, DOI: 10.1109/ICC.2011.5963089ISBN: 978-1-61284-232-5.

* cited by examiner

SYSTEM AND METHOD FOR CHANNEL-DEPENDENT CCA THRESHOLDS TO BALANCE DIFFERENT USE CASES IN WIRELESS NETWORKS

CLAIM OF PRIORITY UNDER 35 U.S.C. §119

The present application for patent claims priority to Provisional Application No. 61/856,520 entitled "SYSTEM AND METHOD FOR CHANNEL-DEPENDENT CCA THRESHOLDS TO BALANCE DIFFERENT USE CASES IN WIRELESS NETWORKS" filed Jul. 19, 2013, and assigned to the assignee hereof. Provisional application No. 61/856,520 is hereby expressly incorporated by reference herein.

The present application for patent claims priority to Provisional Application No. 61/807,517 entitled "SYSTEM AND METHOD FOR CHANNEL-DEPENDENT CCA THRESHOLDS TO BALANCE DIFFERENT USE CASES IN WIRELESS NETWORKS" filed Apr. 2, 2013, and assigned to the assignee hereof. Provisional application No. 61/807,517 is hereby expressly incorporated by reference herein.

BACKGROUND

1. Field

The present application relates generally to wireless communications, and more specifically to systems, methods, and devices for channel-dependent CCA thresholds to balance different use cases in wireless networks.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations allow tuning of medium access parameters.

In some aspects, a device for communicating on a wireless communication network is disclosed. The device comprises a receiver configured to receive transmissions on a plurality of channels; a processor configured to: determine whether a channel of the plurality of channels is one of at least a first type or a second type of channel; if the channel is the first type of channel, determine whether the channel is available based at least in part on a set of first clear channel assessment thresholds; and if the channel is the second type of channel, determine whether the channel is available based at least in part on a set of second clear channel assessment thresholds, where the set of second clear channel assessment thresholds is greater than or equal to the set of first clear channel assessment thresholds.

In another aspect, a method for communicating on a wireless communications network is disclosed. The method comprises receiving a channel of a plurality of channels; determining whether the channel is one of at least a first type or a second type of channel; if the channel is the first type of channel, determining whether the channel is available based at least in part on a set of first clear channel assessment thresholds; and if the channel is the second type of channel, determining whether the channel is available based at least in part on a set of second clear channel assessment thresholds, where the set of second clear channel assessment thresholds is greater than or equal to the set of first clear channel assessment thresholds.

In some aspects, a device for communicating on a wireless communication network is disclosed. The device comprises means for receiving a channel of a plurality of channels; means for determining whether the channel is one of at least a first type or a second type of channel; means for determining whether the channel is available based at least in part on a set of first clear channel assessment thresholds if the channel is the first type of channel; and means for determining whether the channel is available based at least in part on a set of second clear channel assessment thresholds if the channel is the second type of channel, where the set of second clear channel assessment thresholds is greater than or equal to the set of first clear channel assessment thresholds.

In some aspects, a non-transitory, computer readable medium comprising instructions that when executed cause a processor in a device to perform a method for communicating on a wireless communications network is disclosed. The method comprises receiving a channel of a plurality of channels; determining whether the channel is one of at least a first type or a second type of channel; if the channel is the first type of channel, determining whether the channel is available based at least in part on a set of first clear channel assessment thresholds; and if the channel is the second type of channel, determining whether the channel is available based at least in part on a set of second clear channel assessment thresholds, where the set of second clear channel assessment thresholds is greater than or equal to the set of first clear channel assessment thresholds.

DETAILED DESCRIPTION

Figure 1:
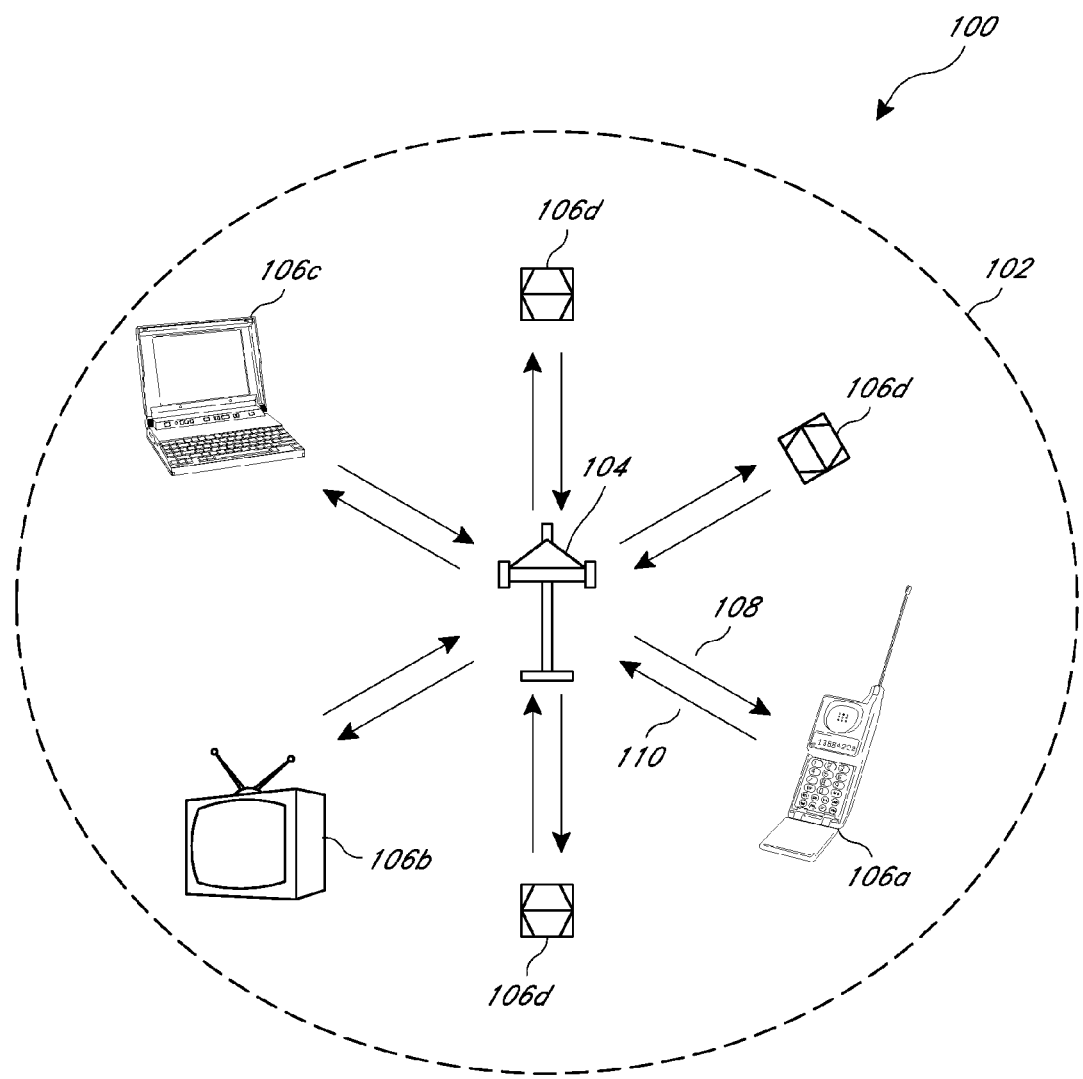
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless nodes, such as stations and APs, may interact in a Carrier Sense Multiple Access (CSMA) type network, such as a network that conforms to the 802.11ah standard. CSMA is a probabilistic Media Access Control (MAC) protocol. "Carrier Sense" describes the fact that a node attempting to transmit on a medium may use feedback from its receiver to detect a carrier wave before trying to send its own transmission. "Multiple Access" describes the fact that multiple nodes may send and receive on a shared medium. Accordingly, in a CSMA type network, a transmitting node senses the medium and if the medium is busy (i.e. another node is transmitting on the medium), the transmitting node will defer its transmission to a later time. If, however, the medium is sensed as free, then the transmitting node may transmit its data on the medium.

Clear Channel Assessment (CCA) is used to determine the state of the medium before a node attempts to transmit thereon. The CCA procedure is executed while a node's receiver is turned on and the node is not currently transmitting a data unit such as a packet. A node may sense whether the medium is clear by, for example, detecting the start of a packet by detecting the packet's PHY preamble. This method may detect relatively weaker signals. Accordingly, there is a low detection threshold with this method. An alternative method is to detect some energy on the air, which may be referred to as energy detection (ED). This method is relatively less sensitive than detecting the start of a packet and may only detect relatively stronger signals. As such, there is higher detection threshold with this method. In general, detection of another transmission on the medium is a function of the received power of the transmission, where the received power is the transmitted power minus the path loss.

While CSMA is particularly effective for mediums that are not heavily used, performance degradation may occur where the medium becomes crowded with many devices trying to access it simultaneously. When multiple transmitting nodes try to use the medium at once, collisions between the simultaneous transmissions may occur and transmitted data may be lost or corrupted. Because with wireless data communications it is generally not possible to listen to the medium while transmitting on it, collision detection is not possible. Further, transmissions by one node are generally only received by other nodes using the medium that are in range of the transmitting node. This is known as the hidden node problem, whereby, for example, a first node wishing to transmit to and in range of a receiving node, is not in range of a second node that is currently transmitting to the receiving node, and therefore the first node cannot know that the second node is transmitting to the receiving node and thus occupying the medium. In such a situation, the first node may sense that the medium is free and begin to transmit, which may then cause a collision and lost data at the receiving node. Accordingly, collision avoidance schemes are used to improve the performance of CSMA by attempting to divide access to the medium up somewhat equally among all transmitting nodes within a collision domain. Notably, collision avoidance differs from collision detection due to the nature of the medium, in this case the radio frequency spectrum.

In a CSMA network utilizing collision avoidance (CA), a node wishing to transmit first senses the medium and if the medium is busy then it defers (i.e. does not transmit) for a period of time. The period of deferral is followed by a randomized backoff period, i.e., an additional period of time in which the node wishing to transmit will not attempt to access the medium. The backoff period is used to resolve contention between different nodes trying to access a medium at the same time. The backoff period may also be referred to as a contention window. Backoff requires each node trying to access a medium to choose a random number in a range and wait for the chosen number of time slots before trying to access the medium, and to check whether a different node has accessed the medium before. The slot time is defined in such a way that a node will always be capable of determining if another node has accessed the medium at the beginning of the previous slot. In particular, the 802.11 standard uses an exponential backoff algorithm wherein each time a node chooses a slot and collides with another node, it will increase the maximum number of the range exponentially. If, on the other hand, a node wishing to transmit senses the medium as free for a specified time (called the Distributed Inter Frame Space (DIFS) in the 802.11 standard), then the node is allowed to transmit on the medium. After transmitting, the receiving node will perform a cyclic redundancy check (CRC) of the received data and send an acknowledgement back to the transmitting node. Receipt of the acknowledgment by the transmitting node will indicate to the transmitting node that no collision has occurred. Similarly, no receipt of an acknowledgment at the transmitting node will indicate that a collision has occurred and that the transmitting node should resend the data.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The STAs 106 are not limited in type and may include a variety of different STAs. For example, as illustrated in FIG. 1, STAs 106 can include a cellular phone 106a, a television 106b, a laptop 106c, and a number of sensors 106d (e.g. a weather sensor or other sensor capable of communicating using a wireless protocol), to name a few.

Figure 2:
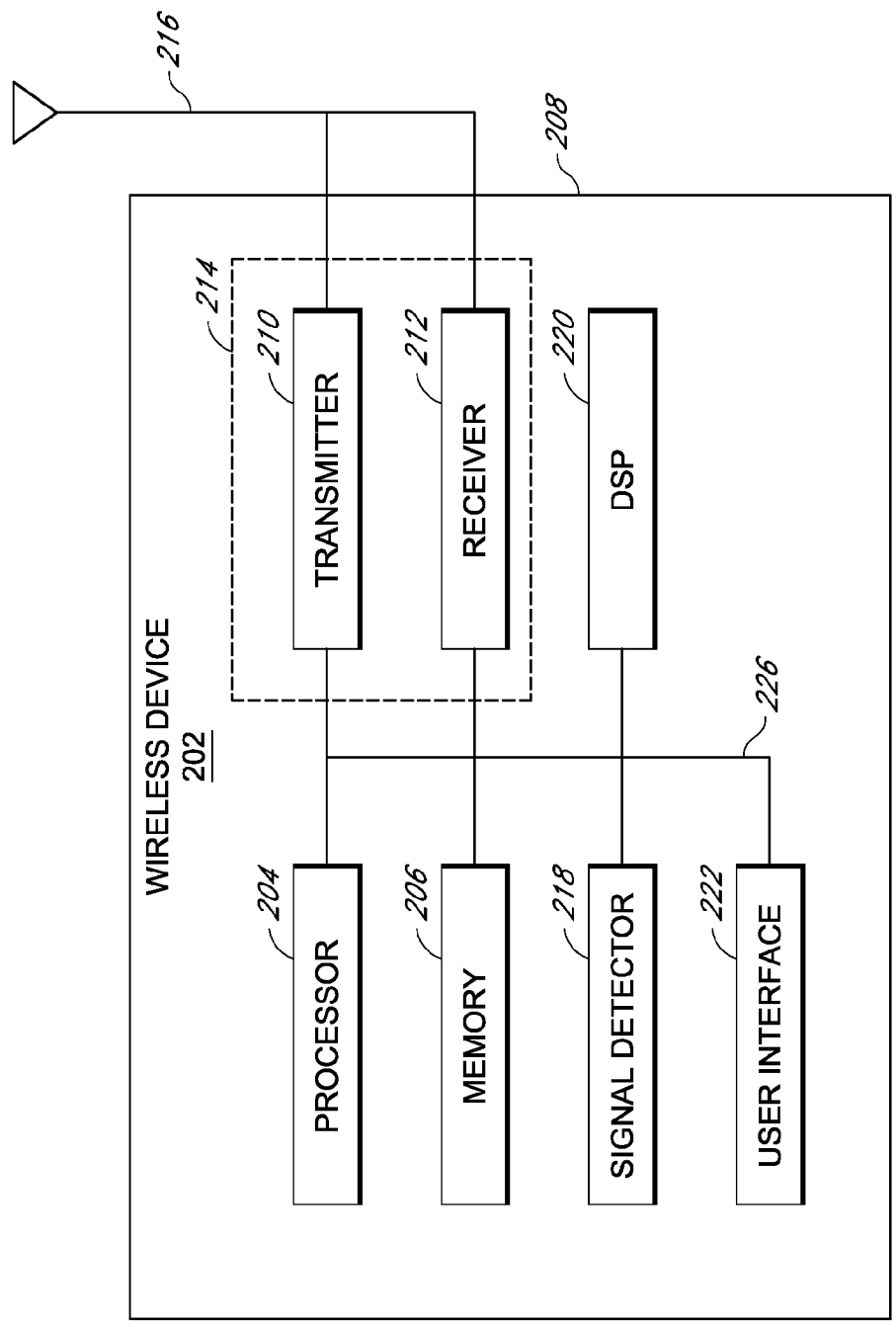
FIG. 2 illustrates an example of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU) or a hardware processor. Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

In certain wireless communications such as those specified in the IEEE 802.11ah protocol, a sub-gigahertz band may be used. This band, due to smaller propagation loss, may allow a longer communication range than other higher bands, given the same transmission power. For example, these bands offer around 8.5 and 15 dB less free space propagation loss over 2.4 GHz or 5 GHz bands, as used in IEEE 802.11n. This longer range may enable devices to communicate from a greater distance. However, in a busy area, this longer range may also mean that any individual device will hear transmissions from a large number of other devices. This may cause issues with the device having to defer to those other transmissions, and not being able to access the medium. For example, a device may check the medium prior to transmitting, and may be much more likely to find that the medium is busy if the device has a significantly longer range. One possible solution to this problem is to raise the CCA thresholds used by the device. A higher CCA threshold may make a device less sensitive to distant devices, and thus, defer to other devices less often. Thus, the higher CCA thresholds may better promote medium reuse and thus generally lead to higher network throughput. In some use cases, such higher CCA thresholds may be desired, for example in use cases where network throughput of the 802.11ah network is most important. However, one issue with raising CCA thresholds is that low bandwidth devices and low power devices may not receive complete protection for their transmissions, as their transmissions may not be of sufficient energy level to exceed the raised CCA thresholds. For example, sensors with 1 or 2 MHz bandwidth and with no PA may be an important use case of IEEE 802.11ah, and these sensors may not receive complete protection for their transmissions on a medium with devices with raised CCA thresholds. These sensors may use low power transmitters in order to minimize power usage. Thus, low CCA thresholds may be beneficial in use cases where better protection may be desired, for example in 802.11ah use cases where longer coverage ranges are desired.

Figure 3:
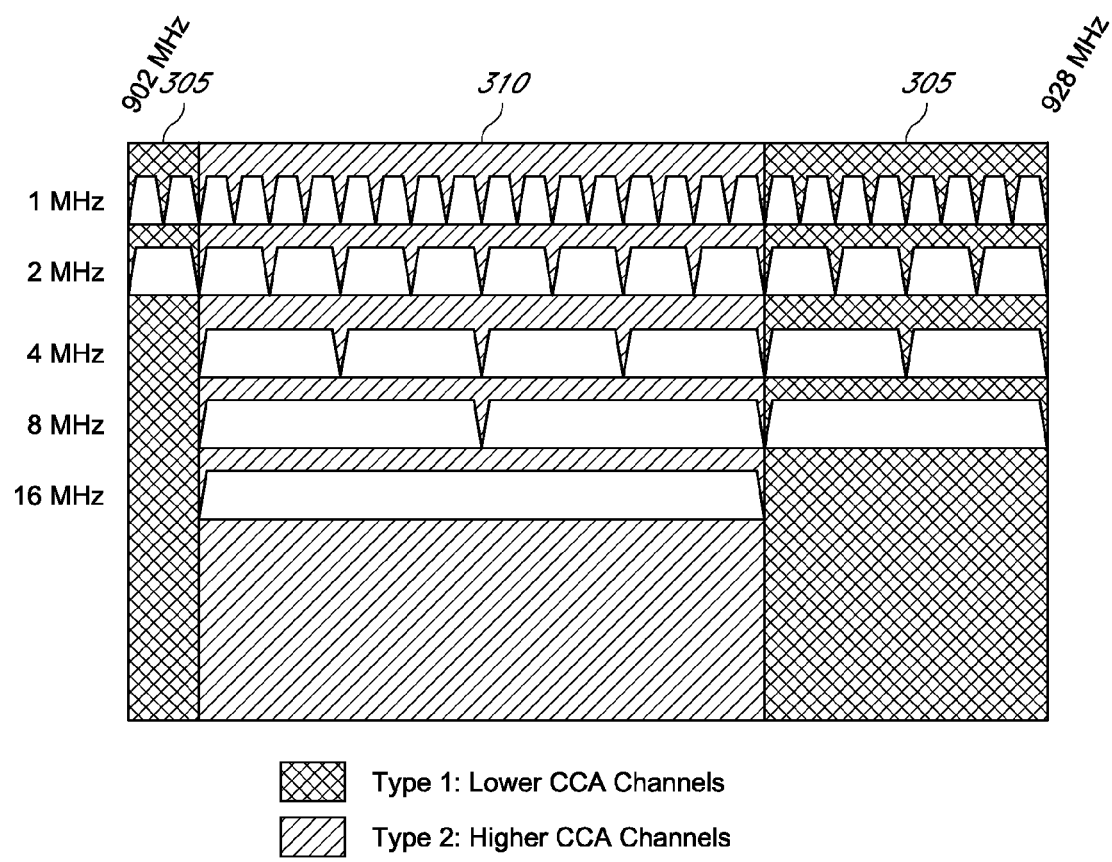
FIG. 3 illustrates an example of a division of channels into two or more types with different CCA thresholds.

Additionally, in some use cases, the spectrum may be split into two or more types of channels, with different CCA thresholds associated with each of the two or more types of channels, and thus present a combination of low thresholds and high thresholds in order to provide for low power and/or low bandwidth transmissions while still obtaining the benefits of increased CCA thresholds. Accordingly, in uses cases where it may be difficult to find one set of thresholds that satisfy the needs of all of the use cases desired, multiple channels may be implemented per use case, each with different sets of thresholds, e.g., a first channel with a high CCA threshold to accommodate higher throughput, and a second channel with a low CCA threshold to accommodate a larger coverage area. For example, FIG. 3 is an illustration of a way to split the IEEE 802.11ah spectrum into two types of channels, with different CCA thresholds associated with the two types of channels. In FIG. 3, the 26 MHz of spectrum that is used for IEEE 802.11ah has been divided into two types, the Type 1 Spectrum 305 and the Type 2 Spectrum 310.

The channels in the Type 2 Spectrum 310 may have higher CCA thresholds than the channels in the Type 1 Spectrum 305. For example, the channels in the Type 2 Spectrum 310 may have CCA thresholds that are 1 dB, 4 dB, 10 dB, 12 dB, 15 dB, or some other amount higher than those in the Type 1 Spectrum 305. These higher CCA thresholds may increase the proportion of times that devices wishing to use this portion of the spectrum are able to use these frequencies, as it may reduce the proportion of the time that such a device would determine that the spectrum is already in use. Similarly, other channels may be provided which have lower CCA thresholds. These channels may benefit low power and/or low bandwidth devices, which may receive more complete protection for their transmissions in the lower CCA threshold channels, as the lower CCA thresholds on these channels may mean that more devices in a wider area will defer to the transmissions of these low-power devices than would defer in a higher CCA threshold channel. In some aspects, channels with lower CCA thresholds may be optimized for coverage range to avoid issues with low power and/or low bandwidth devices having to defer to too many other transmissions, and not being able to access the medium. In some aspects, higher bandwidth devices may be configured to prefer the high CCA threshold channels, such as using those channels as a default, while lower bandwidth devices may prefer to use the lower CCA threshold channels as a default.

The division of the channels in FIG. 3 is merely an example of a way to divide a spectrum. This division may also be done in other portions of the spectrum, and may be done in other manners. For example, more than two channels may be used. The division shown in FIG. 3 may be beneficial for certain portions of the spectrum, as it may allow the single 16 MHz channel contained within this portion of the spectrum to use the higher CCA thresholds. This may be beneficial, as it may allow higher bandwidth devices, such as cellular telephones, to use the 16 MHz channel more often, as the higher CCA thresholds in the Type 2 Spectrum 310 channels may allow these higher bandwidth devices to more frequently access the channel because the channel is found to be in use by other platforms less frequently. While the division of the channels in FIG. 3 provides that no individual channel, such as the single 16 MHz channel, contains both Type 1 and Type 2 portions, other divisions may be used where single channels may contain parts which are higher CCA threshold channels and parts which are lower CCA threshold channels. For example, CCA thresholds may be set that the first 1 MHz of a 2 MHz channel is a Type 2 channel, with higher CCA thresholds, and the second 2 MHz of a 2 MHz channel is a Type 1 channel, with lower CCA thresholds.

In some aspects, the CCA threshold levels for higher CCA threshold channels, such as Type 2 channels, may be derived from the CCA threshold levels of Type 1 channels. For example, the CCA threshold levels of Type 2 channels may be the CCA threshold levels of Type 1 channels, plus some protection factor. In some aspects, the protection factor may be expressed as a delta, or power level difference, measured in decibels. This protection factor may be, for example, 1 dB, 4 dB, 10 dB, 12 dB, 15 dB, or some other dB level. In some aspects, the protection factor may be between 1 dB and 15 dB. In some aspects the protection factor may be any value greater than or equal to zero for at least the lower bandwidth channels. In some aspects the protection factor may be any non-zero value for at least the lower bandwidth channels. In addition, in some aspects the higher bandwidths may have a zero dB protection factor. In still another aspect, the protection factor may be set to zero in only some circumstances, individually setting a protection factor for some bandwidths, but not for all bandwidths. This protection factor may be applied to each of the CCA thresholds for a channel.

For example, a channel may have three different CCA thresholds. A channel may have a higher CCA threshold for energy detection, a lower CCA threshold level for mid packet detection, and a lower-still CCA threshold level of start of packet (preamble signal) detection. In some aspects, each of these CCA threshold levels of a Type 1 channel may be increased by a protection factor in a Type 2 channel. In some aspects, the protection factor for each level may be the same or may be different for each of the CCA thresholds. In some aspects, the protection factor used may differ for different bandwidth channels. For example, 8 MHz channels may use different CCA thresholds and different protection factors than 16 MHz channels.

In some aspects, the channelization and protection factors disclosed herein tend to favor some types of transmissions over other types of transmissions. This is graphically described in more detail with respect to FIG. 6. As a non-limiting example, a given channelization may employ a higher CCA level for Type 2 transmissions having higher data rates or bandwidth or more efficient transmissions, over the lower bandwidth, or lower efficiency transmissions. Conversely, the same example may disfavor a Type 1 transmission having the lower bandwidth or lower efficiency. This is possible in an aspect assigning a higher CCA threshold and lower protection factor to a given Type 2 channel, than that assigned to a Type 1 channel, for instance. A Type 2 channel as disclosed herein, having a lower protection factor and higher CCA threshold will experience fewer instances of a "busy medium" and therefore defer transmissions less frequently than a Type 1 channel with a higher protection factor and a lower CCA threshold.

Figure 5:
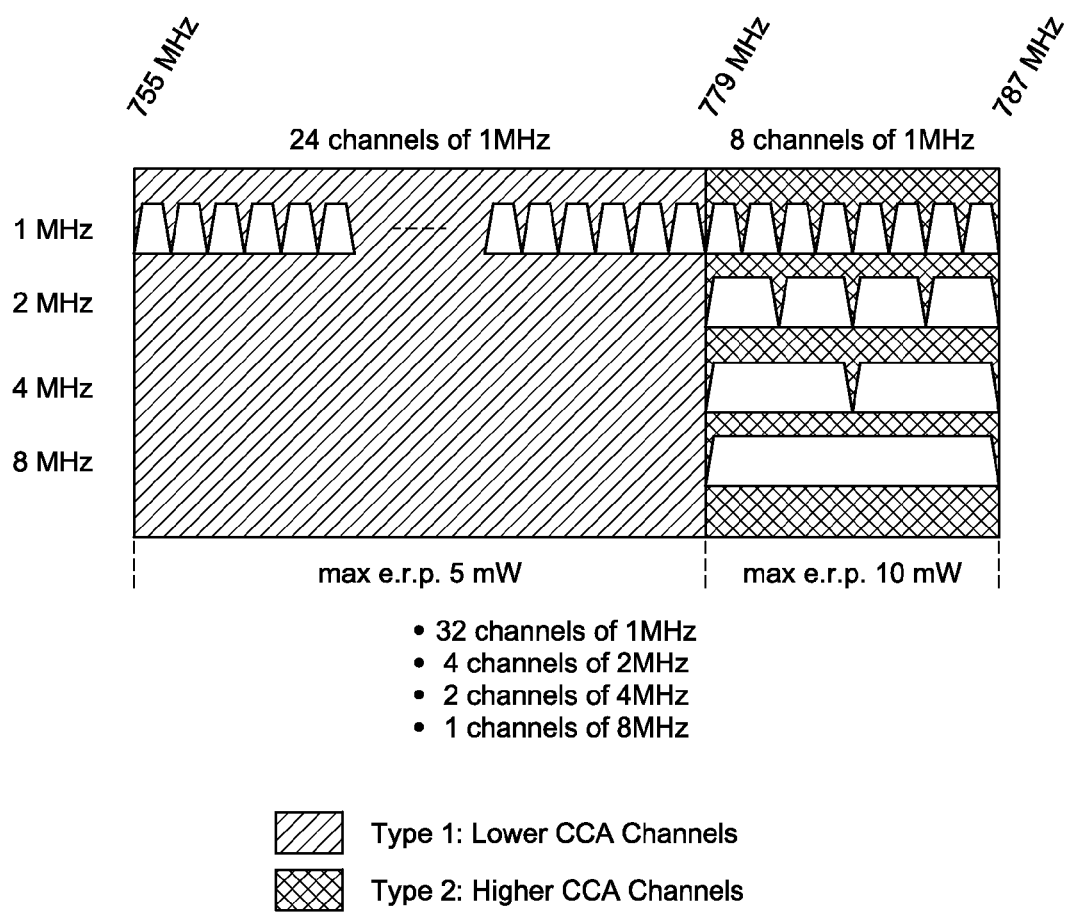
FIG. 5 illustrates another example of a division of channels into two or more types with different CCA thresholds.

In some aspects, FIG. 3 may represent a possible channelization for IEEE 801.11ah networks in some regions, such as in the United States. This channelization may be beneficial because there are no channels which straddles different CCA level regions. Another benefit of this channelization may be that there is a 16 MHz Type 2 channel provided, for high data-rate devices. It may also be beneficial that the two Type 1 channel areas are separated in frequency, which may help sensors avoid interference. In some aspects, other channelizations may be used. For example, other channelizations may be used in other regions. For example, FIG. 5 illustrates another possible channelization. This channelization may be used in China or other regions where a significant wireless spectrum is available. In this channelization, the Type 1 channels, with a higher CCA threshold may be between 755 and 779 MHz. This may provide twenty-four 1 MHz channels of Type 1 channels. As discussed above, these channels may be used efficiently by low-bandwidth devices. High-bandwidth devices may use the Type 2 channels between 779 and 787 MHz, which may include eight 1 MHz channels, four 2 MHz channels, two 4 MHz channels, and one 8 MHz channel. This channelization may offer some of the same benefits as those provided by the channelization of FIG. 3, such as not containing channels which straddle different CCA level regions.

Figure 4:
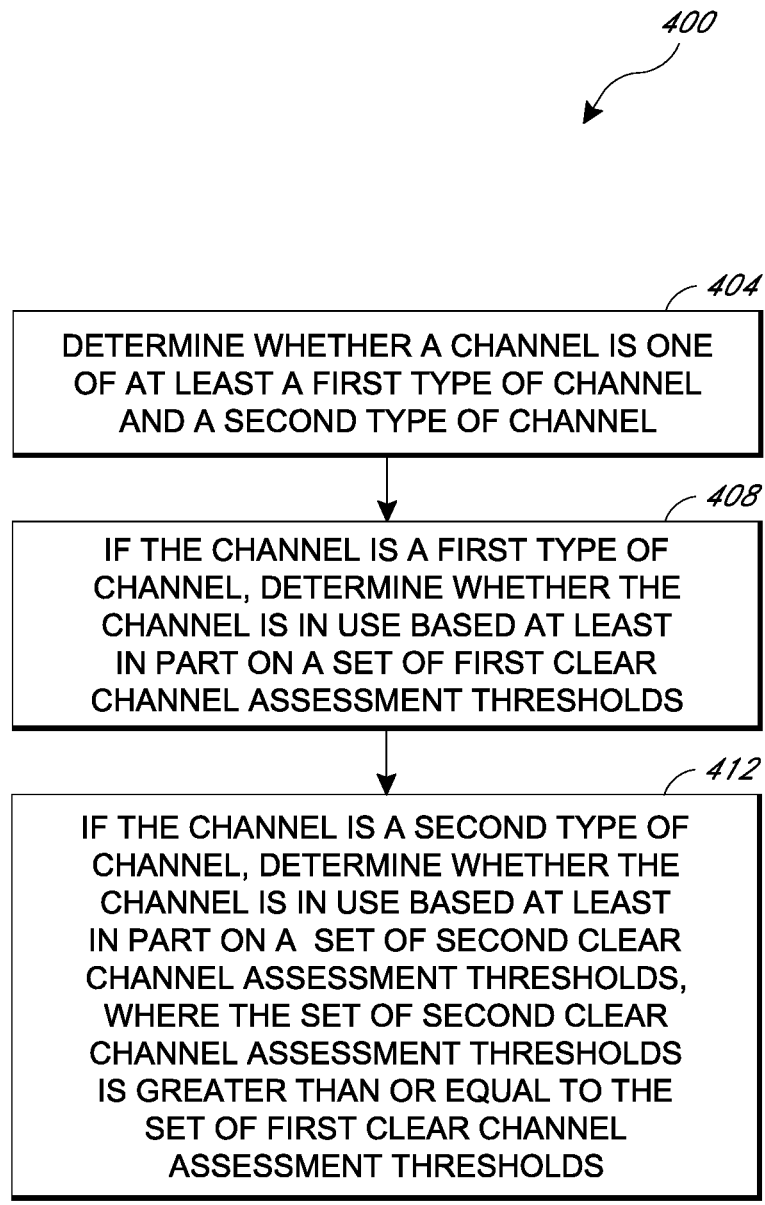
FIG. 4 shows a method of using channel-dependent CCA thresholds in a wireless device which may be used by wireless devices such as a STA 106.

FIG. 4 shows a method of using channel-dependent CCA thresholds in a wireless device. This method may be used by wireless devices such as a STA 106.

At block 404, the STA 106 determines whether a channel is one of at least a first type of channel and a second type of channel. For example, the channels that the STA 106 is configured to communicate using may be divided according to the division illustrated in FIG. 3, into two types of channels. In some aspects, three of more types of channels may be used. In some aspects, a channel, such as a 2 MHz channel, may be both a first type of channel for some portion of the channel, and a second type of channel, for some other portion of the channel. In such a channel, both a set of first and a second clear channel assessment thresholds may be used for the different portions of the channel. In some aspects, the channels may be wireless communication channels on a network, such as an IEEE 802.11ah network. In some aspects, the channels may be at least one of 1 MHz, 2 MHz, 4 MHz, 8 MHz or 16 MHz channels. In some aspects, the channels may be sub-gigahertz channels. In some aspects, the STA 106 may be a low powered or low bandwidth device, and may be configured to use the first type of channel by default. In some aspects, the STA 106 may be a high bandwidth device, and may be configured to use the second type of channel by default.

In some aspects, determining whether a channel is a first or second type of channel may be done using a look-up table. For example, a table may be maintained on a wireless device that contains information sufficient to enable a wireless device to determine whether a particular channel is a first or a second type of channel. In some aspects, an access point or other wireless device may contain information sufficient to allow the wireless device to determine whether a channel is a first or second type of channel. For example, a wireless device may receive information from the access point, such as a look-up table, sufficient to determine a type of a particular channel. In some aspects, the access point may transmit this information periodically. In some aspects, a wireless device may be programmed with a look-up table or other information which may be used to determine a type of a particular channel.

At block 408, if the channel is a first type of channel, the STA 106 determines whether the channel is in use based at least in part on a set of first clear channel assessment thresholds. In some aspects, the set of first clear channel assessment thresholds may comprise a plurality of different thresholds, for different types of clear channel assessment, such as for energy detection, preamble detection, and mid packet interval detection.

At block 412, if the channel is a second type of channel, the STA 106 determines whether the channel is in use based at least in part on a set of second clear channel assessment thresholds, where the set of second clear channel assessment thresholds is greater than or equal to the set of first clear channel assessment thresholds. In some aspects, the set of second clear channel assessment thresholds may comprise a plurality of different thresholds, for different types of clear channel assessment, such as for energy detection, preamble detection, and mid packet detection. In some aspects, the set of second clear channel assessment thresholds may be based on the set of first clear channel assessment thresholds, plus a protection factor. In some aspects, the protection factor for the different types of clear channel assessment may be different.

Figure 6:
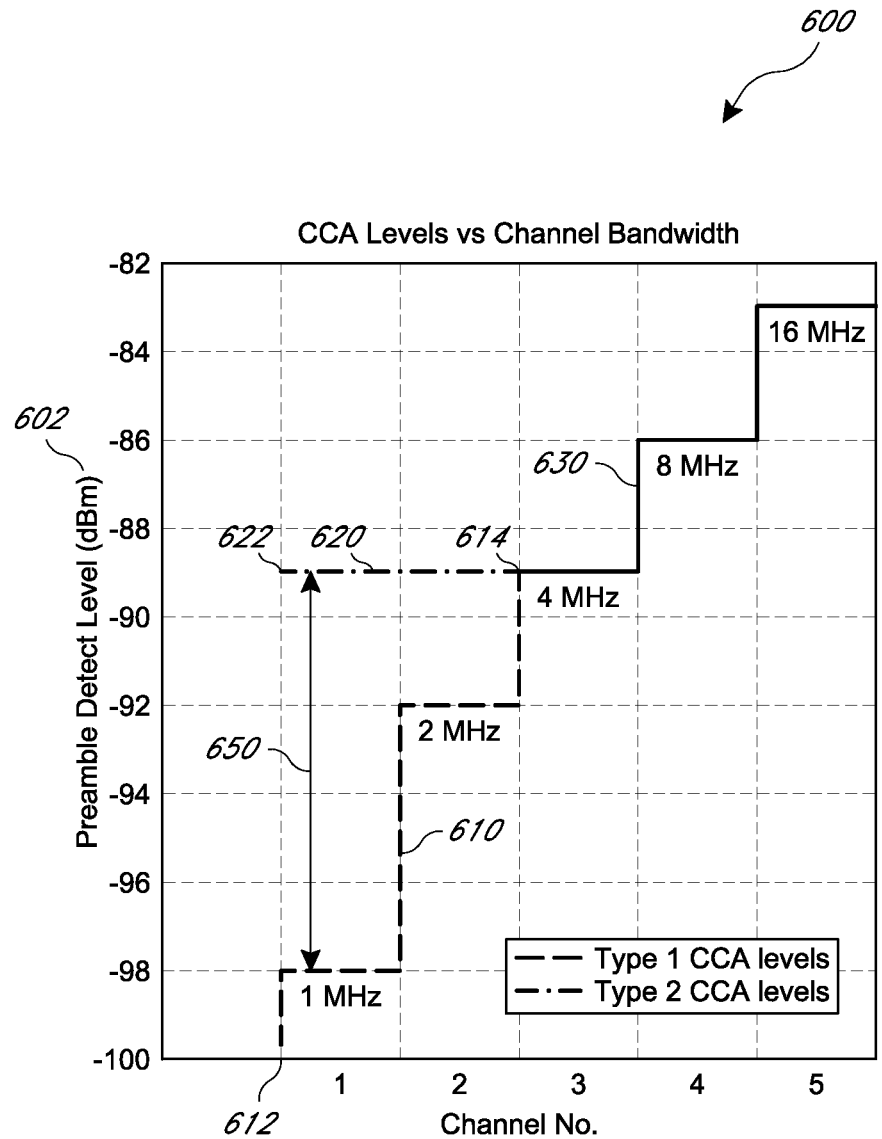
FIG. 6 is a graph depicting an exemplary distribution of clear channel assessment levels plotted against channel numbers and bandwidths.

Referring now to FIG. 6, a graph, generally designated 600, is shown depicting an exemplary distribution of CCA levels on the vertical axis 602, described at times herein as "Preamble Detect (PD) Level," expressed in terms of dBm, plotted against an exemplary channelization on the horizontal axis 604. Three lines 610, 620, and 630 indicate the CCA threshold level for Type (1 or 2) and channel. Lines 610, 620, and 630 are drawn generally in a staircase manner depicting the distribution of the PD levels versus channel number, each channel number having a different bandwidth, as noted on the graph. The bandwidth of each Type 1 and Type 2 channels may be the same with varying CCAs, as shown. Line 610-630 is drawn along the CCA levels for each of the Type 1 channels 1 through 5, beginning on the horizontal axis at point 612. As shown, exemplary channel 1 is shown having a 1 MHz bandwidth, channel 2 has a 2 MHz bandwidth, channel 3 has a 4 MHz bandwidth, channel 4 has an 8 MHz bandwidth, and channel 5 has a 16 MHz bandwidth. It should be appreciated by those skilled in the art that the specific distribution of channel number versus bandwidth should not to be considered limiting.

Line 610 also corresponds with Type 1 PD levels and channelization, beginning as a dashed line at point 612 for channels 1 and 2 and turning into a solid line at point 614 (corresponding with line 630) for channels 3, 4, and 5.

Similarly, exemplary line 620 (shown as a dot-dash line) traces the Type 2 CCA threshold along the channelization beginning at point 622 for channels 1 and 2 and turning into the solid line at point 614 for channels 3, 4, and 5. Accordingly, solid line 630 annotates that Type 1 and Type 2 CCA levels versus channelization may have the same bandwidth and PD value for each of the higher bandwidth channels 3, 4, and 5, to the right of and above point 614.

Importantly, the vertical separation, or delta 650, is demonstrative of the PD level separation between the CCA levels of Type 1 channels 1 and 2, and Type 2 channels 1 and 2. In some aspects, delta 650 may be set to greater than zero (0) for 1 and 2 MHz PD levels. Conversely, delta 650 may also be set to zero (0) for 4, 8, and 16 MHz PD levels, for example. The delta 650 may also be referred to herein as the protection factor as described above. This type of PD level distribution may tend to favor transmission of higher power Type 2 channels with the same bandwidth as a lower power Type 1 channel by increasing the CCA level using the protection factor for a given set of channels. In some aspects, CCA levels may be based on a bandwidth and selected to favor a specific bandwidth or bandwidths as shown. FIG. 6 depicts a possible channelization providing high CCA thresholds for lower bandwidth Type 2 channels, and equal CCA threshold levels for high bandwidth channels in both Type 1 and Type 2 formats. As such, the Type 1 and Type 2 channels follow the same PD level distribution with line 630, referencing the 4, 8, and 16 MHz bandwidths for channels 3, 4, and 5.

In still another aspect, the delta 650 may be applied irregularly across the spectrum of selected bandwidths, such as the exemplary bandwidths 1-5 shown; i.e. the protection factor or delta 650 may be applied to bandwidths 1, 3, and 5 but not to 2 and 4 (not shown). Such a distribution may allow a given system to prioritize particular transmissions over other transmissions as discussed above. However in some aspects, such an application of the protection factor or delta 650 may not necessarily be based on bandwidth or efficiency, as other signal characteristics may be considered.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A device for communicating on a wireless communication network, the device comprising:
    a receiver configured to receive transmissions on a plurality of channels;
    a processor configured to:
        determine whether a channel of the plurality of channels is one of at least a first type or a second type of channel;
        if the channel is the first type of channel, determine whether the channel is available based at least in part on a set of first clear channel assessment thresholds; and
        if the channel is the second type of channel, determine whether the channel is available based at least in part on a set of second clear channel assessment thresholds, where the set of second clear channel assessment thresholds is greater than or equal to the set of first clear channel assessment thresholds, wherein the second set of clear channel assessment thresholds is derived from a sum of the first set of clear channel assessment thresholds and a protection factor based at least in part on a bandwidth of a channel of the plurality of channels.

2. The device of claim 1, the set of first clear channel assessment thresholds comprising a plurality of threshold values.

3. The device of claim 2, the set of first clear channel assessment thresholds comprising thresholds for two or more of mid packet detection, start of packet detection, and energy detection.

4. The device of claim 1, the set of second clear channel assessment thresholds comprising a plurality of threshold values.

5. The device of claim 4, the set of second clear channel assessment thresholds comprising thresholds for two or more of mid packet detection, start of packet detection, and energy detection.

6. The device of claim 1, the protection factor being a non-zero value.

7. The device of claim 1, the protection factor having a value of zero.

8. The device of claim 1, further comprising a transmitter configured to transmit on the channel if the channel is available.

9. The device of claim 1, the wireless communication network comprising a sub-gigahertz network.

10. The device of claim 1, the channel being at least one of a 1 MHz, 2 MHz, 4 MHz, 8 MHz, or 16 MHz channel.

11. The device of claim 1, a first portion of the channel being a first type of channel and a second portion of the channel is a second type of channel.

12. A method for communicating on a wireless communications network, the method comprising:
   determining whether a channel of a plurality of channels is one of at least a first type or a second type of channel;
   if the channel is the first type of channel, determining whether the channel is available based at least in part on a set of first clear channel assessment thresholds; and
   if the channel is the second type of channel, determining whether the channel is available based at least in part on a set of second clear channel assessment thresholds, where the set of second clear channel assessment thresholds is greater than or equal to the set of first clear channel assessment thresholds, wherein the second set of clear channel assessment thresholds is derived from a sum of the first set of clear channel assessment thresholds and a protection factor based at least in part on a bandwidth of a channel of the plurality of channels.

13. The method of claim 12, the set of first clear channel assessment thresholds comprising a plurality of threshold values.

14. The method of claim 12, the set of second clear channel assessment thresholds comprising a plurality of threshold values.

15. The method of claim 13, the set of first clear channel assessment thresholds comprising thresholds for two or more of mid packet detection, start of packet detection, and energy detection.

16. The method of claim 13, the set of second clear channel assessment thresholds comprising thresholds for two or more of mid packet detection, start of packet detection, and energy detection.

17. The method of claim 12, the protection factor being a non-zero value.

18. The method of claim 12, the protection factor having a value of zero.

19. The method of claim 12, further comprising transmitting on the channel if the channel is available.

20. The method of claim 12, the wireless communication network comprising a sub-gigahertz network.

21. The method of claim 12, the channel being at least one of a 1 MHz, 2 MHz, 4 MHz, 8 MHz, or 16 MHz channel.

22. The method of claim 12, a first portion of the channel being a first type of channel and a second portion of the channel is a second type of channel.

23. The method of claim 13, further comprising receiving information sufficient to determine whether the channel of the plurality of channels is one of at least the first or the second type of channel.

24. A device for communicating on a wireless communication network, the device comprising:
   means for determining whether means for receiving a channel of a plurality of channels is one of at least a first type or a second type of channel;
   means for determining whether the channel is available based at least in part on a set of first clear channel assessment thresholds if the channel is the first type of channel; and
   means for determining whether the channel is available based at least in part on a set of second clear channel assessment thresholds if the channel is the second type of channel, where the set of second clear channel assessment thresholds is greater than or equal to the set of first clear channel assessment thresholds, wherein the second set of clear channel assessment thresholds is derived from a sum of the first set of clear channel assessment thresholds and a protection factor based at least in part on a bandwidth of a channel of the plurality of channels.

25. A non-transitory, computer readable medium comprising instructions that when executed cause a processor in a device to perform a method for communicating on a wireless communications network, the method comprising:
   determining whether means for receiving a channel of a plurality of channels is one of at least a first type or a second type of channel;
   if the channel is the first type of channel, determining whether the channel is available based at least in part on a set of first clear channel assessment thresholds; and
   if the channel is the second type of channel, determining whether the channel is available based at least in part on a set of second clear channel assessment thresholds, where the set of second clear channel assessment thresholds is greater than or equal to the set of first clear channel assessment thresholds, wherein the second set of clear channel assessment thresholds is derived from a sum of the first set of clear channel assessment thresholds and a protection factor based at least in part on a bandwidth of a channel of the plurality of channels.

* * * * *